(12) United States Patent
Petrovic

(10) Patent No.: US 7,731,017 B2
(45) Date of Patent: Jun. 8, 2010

(54) DEVICE FOR DRIVING LOAD CONVEYORS OR TRANSPORTERS

(75) Inventor: Zmaj Petrovic, Octeville sur Mer (FR)

(73) Assignee: Sidel Participations SAS, Octeville sur Mer (FR)

( * ) Notice: Subject to any disclaimer, the term of this patent is extended or adjusted under 35 U.S.C. 154(b) by 167 days.

(21) Appl. No.: 11/918,798

(22) PCT Filed: Apr. 11, 2006

(86) PCT No.: PCT/FR2006/050329

§ 371 (c)(1),
(2), (4) Date: Dec. 31, 2007

(87) PCT Pub. No.: WO2006/111673

PCT Pub. Date: Oct. 26, 2006

(65) Prior Publication Data

US 2009/0032373 A1 Feb. 5, 2009

(30) Foreign Application Priority Data

Apr. 18, 2005 (FR) .................................. 05 03854
Jun. 22, 2005 (FR) .................................. 05 06345

(51) Int. Cl.
*B65G 15/14* (2006.01)
(52) U.S. Cl. .............. 198/626.4; 198/626.6; 198/465.3
(58) Field of Classification Search ............... 198/382, 198/465.3, 612, 620, 626.3, 626.4, 626.6
See application file for complete search history.

(56) References Cited

U.S. PATENT DOCUMENTS

| | | | |
|---|---|---|---|
| 3,194,382 A | 7/1965 | Nigrelli et al. | |
| 3,521,322 A * | 7/1970 | Wenzel et al. | 198/626.6 |
| 3,722,657 A | 3/1973 | Kienle et al. | |
| 4,934,510 A | 6/1990 | Lutgendorf et al. | |
| 5,699,651 A | 12/1997 | Miller et al. | |
| 6,557,696 B1 * | 5/2003 | Frich | 198/626.6 |
| 6,955,256 B2 * | 10/2005 | Tsoukalas et al. | 198/626.5 |

FOREIGN PATENT DOCUMENTS

| | | |
|---|---|---|
| DE | 21 29 089 A1 | 1/1972 |
| DE | 85 18 948 U1 | 8/1985 |
| DE | 101 54 203 A1 | 6/2002 |
| GB | 1471769 | 4/1977 |

* cited by examiner

*Primary Examiner*—James R Bidwell
(74) *Attorney, Agent, or Firm*—The Watson I.P. Group, PLC; Jovan N. Jovanovic; Vladan M. Vasiljevic

(57) ABSTRACT

A device for driving load conveyors or transporters in the form of a driving and guiding means (4), integrated in a line of conveyors or transporters (1 and 2) and extending along the longitudinal axis of said conveyors or transporters (1 and 2), perpendicularly to their plane and essentially formed by the combination of a driving belt (5), arranged along at least one longitudinal edge or in the extension of longitudinal edges of at least one conveyor or transporter (1 and 2) or two successive conveyors or transporters (1 and 2), and of a guide applying (6) the loads against the driving belt (5), arranged along the longitudinally opposite edges. Particular applicability is in the field of conveying by means of pallet conveyors or transporters, in particular with change of rate of transport and/or of level between conveyors.

10 Claims, 4 Drawing Sheets

DEVICE FOR DRIVING LOAD CONVEYORS OR TRANSPORTERS

The present invention relates to the field of the conveyance of loads by means of palette conveyors or transporters, notably with a change in the rate of transport and/or a change of the level between conveyors, and it relates to a device for driving load conveyors or transporters.

In many industrial fields, load conveyors or transporters are used routinely to transfer loads between work stations, to storage or packaging stations, or to shipping stations. The loads can be in the form of pieces, containers, or compartmentalized boxes for holding bottles. Moreover, this type of conveyor or transporter can be used between centers for screening objects or containers, and more specifically returnable bottles.

In general, these load conveyors or transporters are in the form of elongated tables equipped with motorized rollers, which are arranged perpendicularly to their longitudinal axis and aligned parallel to each other, or in the form of chains with palettes or with a belt with flexible band, or with notched belts, and the loads to be transported are simply arranged so that they are approximately centered on these conveyors, i.e., the conveyors, for rectilinear transfer, are currently in the form of two symmetric small chains. These load conveyors or transporters meet the usual requirements for the transport of loads between working stations in a satisfactory way.

However, if such conveyors or transporters open onto accumulation stations, before loading or another procedure, or if they are intended to perform a change in level, a problem arises when driving or retaining these loads on the conveyors or transporters.

Indeed, in the case of an accumulation station, load retention devices are used. They are in the form of retractable abutments placed across the path taken by the loads, so that they stop them. The disadvantage of this device is the rapid, abrupt movement of heavier loads that forcefully hit the abutment. In the long run, this type of impact causes serious damage that affects the blocking device.

To overcome this drawback, it is generally proposed to use conveyors or transporters, where chains with palettes are provided with a cover that has a higher coefficient of adhesion, which makes it possible to improve the support of the loads, and thus their braking or their driving. However, the cover with higher coefficient of adhesion is chosen as a function of the weight of the loads, so that this type of conveyors or transporters are [sic; is] inoperative when the weight of the loads to be moved or accumulated is not constant.

In addition, this type of conveyor or transporters, as described in the previous paragraph, is also used for changes in level; however, the inclination of the slope of these conveyors or transporters will be limited necessarily to a relatively low value, due to the limit of adhesion of the cover.

The purpose of the present invention is to overcome these disadvantages by proposing a device for driving load conveyors or transporters, which makes it possible to achieve a controlled driving and/or accumulation and/or transfer of the loads between different levels of conveyors or transporters.

For this purpose, the device according to the invention for driving load conveyors or transporters is characterized in that it is in the form of a driving and guiding means, which is integrated in a line of conveyors or transporters, and extends along the longitudinal axis of said conveyors or transporters, perpendicularly to their plane, and which consists essentially of the combination of a driving belt, arranged along at least one longitudinal edge or in the extension of the longitudinal edges of at least one conveyor or transporter, or of two successive conveyors or transporters, and of a guide for applying the loads against the driving belt, which guide is arranged along the opposite longitudinal edge(s).

The invention will be understood better thanks to the following description which refers to preferred embodiments that are given as nonlimiting examples, and explained in reference to the schematic drawings in the appendix, in which.

Figure 1:
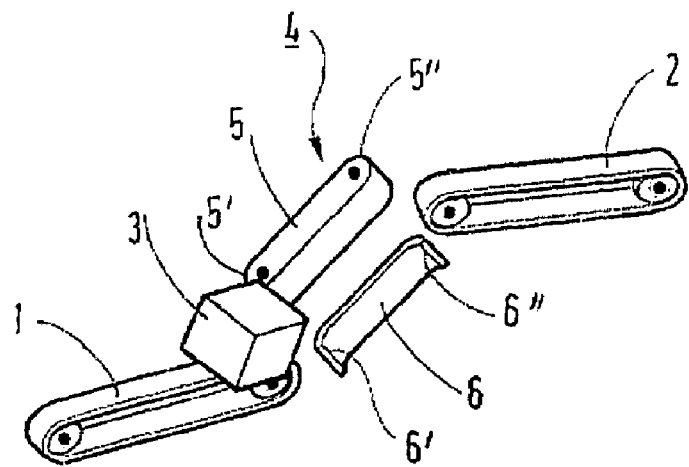
FIG. 1 is a plan view of a set of conveyors or transporters using a device according to the invention.

FIGS. 1-4 of the drawings in the appendix represent, as examples, an upstream load conveyor or transporter 1, and a downstream load conveyor or transporter 2, which are intended to convey loads 3 between different work stations.

In the remainder of the description, the term upstream conveyor is used to denote the conveyor by means of which the loads arrive, and the term downstream conveyor is used to denote the conveyor by means of which the loads exit, when their processing by the transfer device is completed.

In FIGS. 1-4 of the drawings in the appendix, the load 3, which is in the form of a box, for example, for holding bottles or similar items, but it can also be of any other shape, namely it can be in the form of a simple piece, which may or may not be machined, or of a set of assembled pieces. The load 3, which is moved on the upstream conveyors or transporters 1, and on the downstream conveyors or transporters 2, is always arranged on the latter in a centered way, that is, in a way so that it is perfectly balanced when it is located only on these upstream conveyors or transporters 1, or on these downstream conveyors or transporters 2, and extends, over a part of its length, past both sides of said upstream conveyors 1 and downstream conveyors 2.

Figure 2:
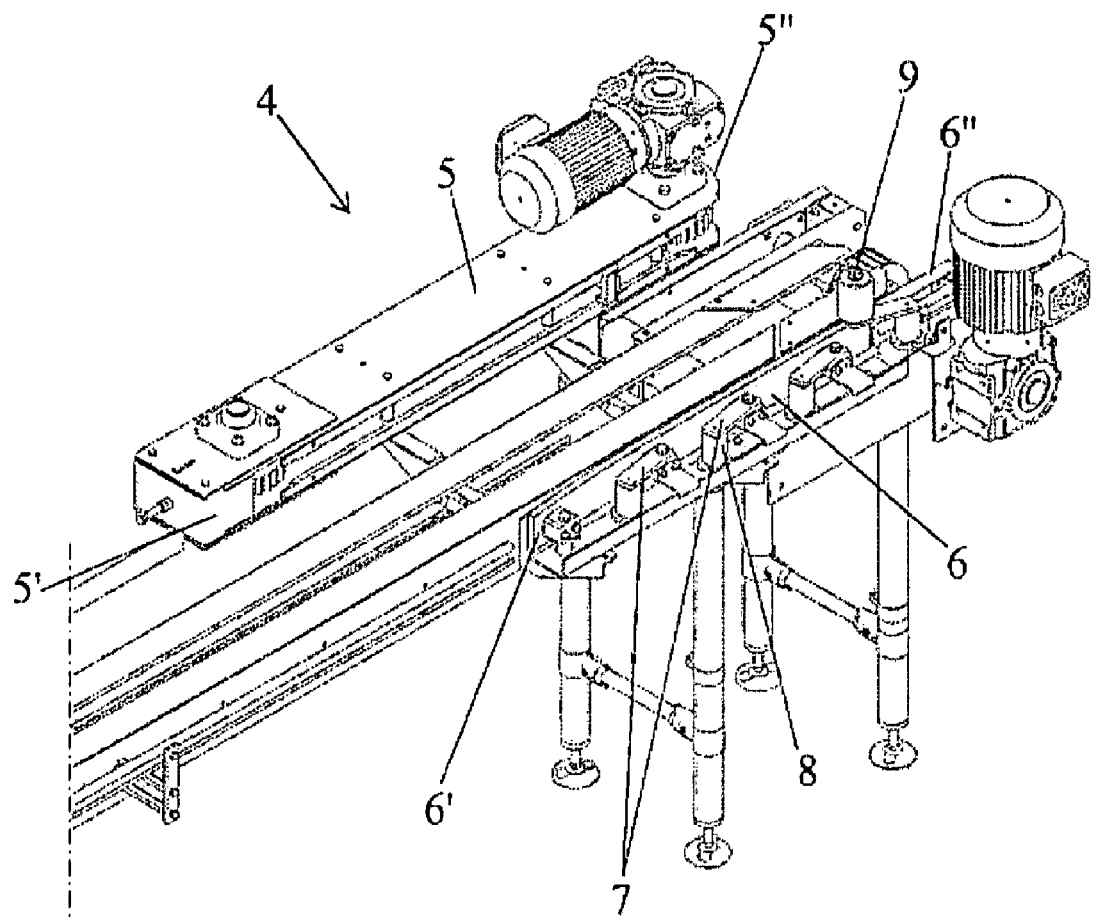
FIG. 2 is a perspective view, on a larger scale, of the device according to FIG. 1.
Figure 3:
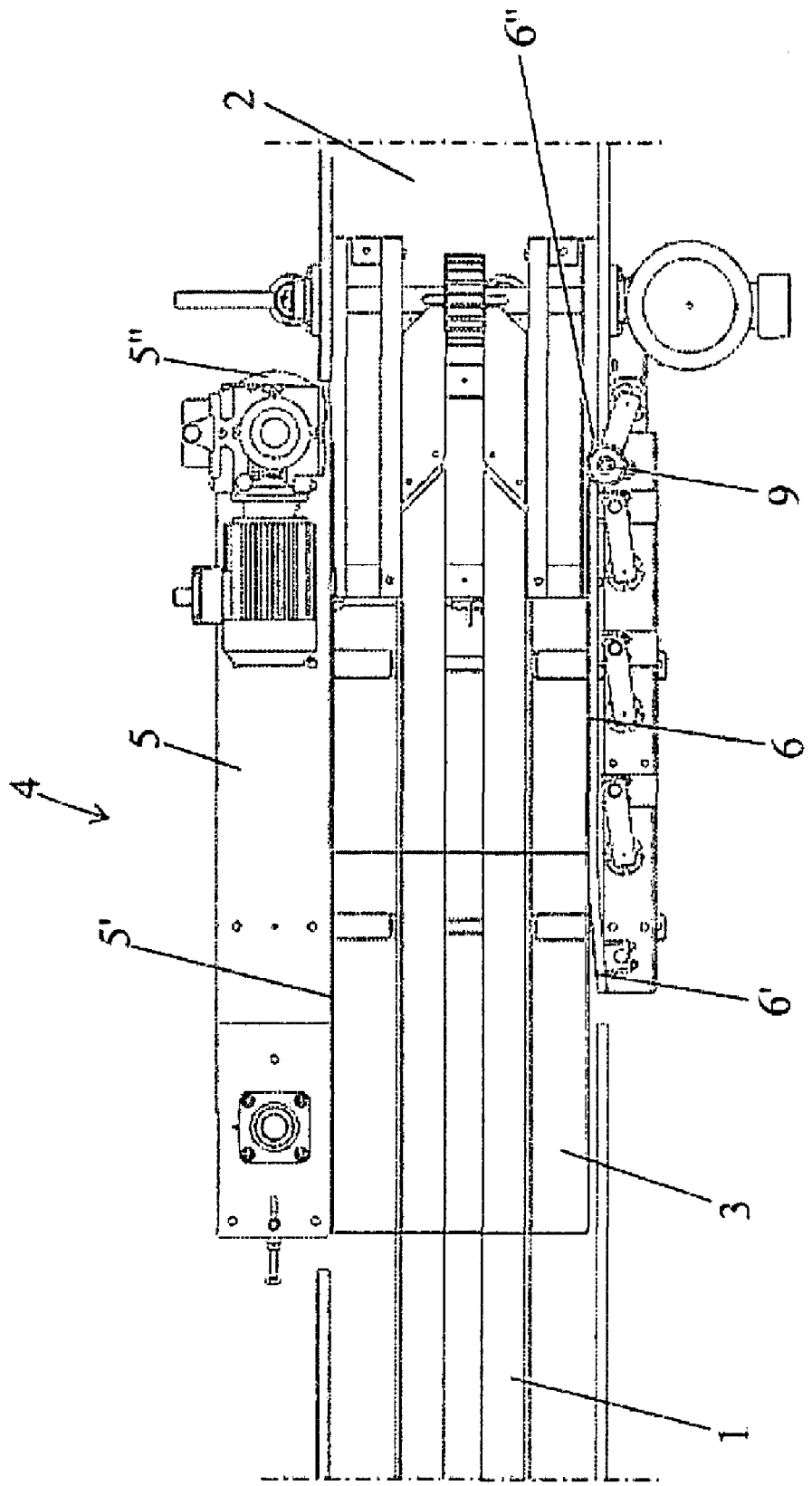
FIG. 3 is a perspective view of an embodiment variant of the invention.

One of the load transporters or conveyors, in this case the downstream conveyor or transporter 2 of FIGS. 1 and 2, can also constitute itself a work station, namely, for example, a station for gathering or grouping the loads 3 before their final packaging or their transfer in groups of loads. The loads 3 are also usually moved between different levels, i.e., from an upstream conveyor or transporter 1 to a downstream conveyor or transporter 2, which is located at a higher level (FIG. 3). In such cases, it is necessary to reduce the speed of the loads 3 before they arrive on the downstream conveyor or transporter 2, or to speed up the advance of the loads as they are moved to a different level.

For this purpose, the object of the invention is a device for driving load conveyors or transporters, which is in the form of a driving and guiding means, which is integrated in a line of conveyors or transporters 1 and 2, which extends in the longitudinal axis of said conveyors or transporters 1 and 2, perpendicularly to their plane, and which consists essentially of the combination of a driving belt 5, arranged along at least one longitudinal edge or in the extension of the longitudinal edges of at least one conveyor or transporter 1 or 2, or of two successive conveyors or transporters 1 and 2, and of a guide 6 for applying loads 3 against the driving belt 5, which is arranged along the opposite longitudinal edge(s).

According to a characteristic of the invention, the driving belt 5 and the guide 6 for applying loads 3 are arranged, with respect to the chains with palettes, which form the conveyors or transporters 1 and 2, in such a way that the distance between their opposite face is slightly less than the width of the loads 3 transported by said conveyors or transporters 1 and 2.

It is preferred for the driving belt 5 to be a belt with a cover made of rubber or another material with a high coefficient of friction, and for the guide 6 for applying loads 3 to be in the form of a rigid blade with ends that are slightly curved inward in the opposite direction with respect to the drive belt 5 and with a low coefficient of friction, where said rigid blade is mounted on supports 7 for fixation to the corresponding side of the conveyor(s) or transporter(s) 1 and/or 2, with interposition of means presenting controlled elastic deformation, such as springs that are adjusted with screws. As a result, it is possible to preset the force of application of the rigid blade forming the guide 6 for applying the loads 3, to ensure, under all circumstances, a good support of said loads 3 between said application guide 6 and the drive belt 5, taking into account notably the possible variations in the width of the loads 3.

Moreover, the drive belt 5 is driven independently of the conveyors or transporters 1 and/or 2, and it is connected to an independent control means, such as a programmable automation device or another device, which automatically controls the speed of said drive belt 5 as a function of the speed required downstream of the driving and guiding device 4.

According to another characteristic of the invention, the supports 7 for the fixation of the guide 6 for applying loads 3 are advantageously mounted on the frame of the conveyor(s) or transporter(s) 1 and/or 2 with the possibility of being moved transversely to the longitudinal axis of said conveyor(s) or transporter(s) 1 and/or 2 by means of controlled jacks 8. The control of the jacks 8 is achieved advantageously through the intermediary of a programmable automation device or another device for the control of a conveyance or transport line, whose command and control program is parameterized as a function of the loads 3, and of the operations to be carried out.

Thus, it is possible to regulate the separation between the drive belt 5 and the guide 6 for applying loads 3 as a function of the width of the latter.

Figure 5:
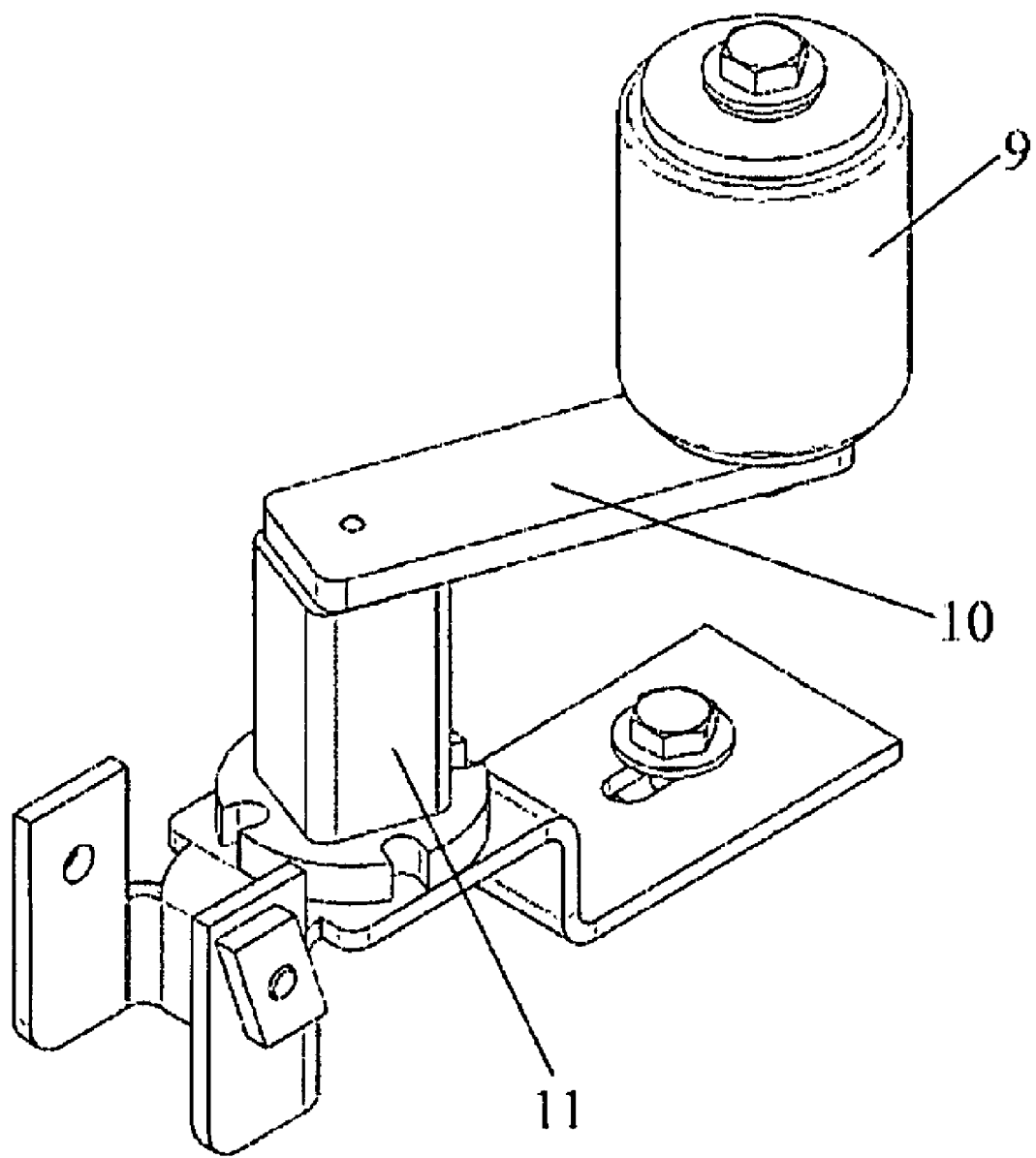
FIG. 5 is a perspective view of an additional means for applying the loads against the driving belt.

In addition, according to another characteristic of the invention, the device can be completed by an additional means for applying charges 3 against the drive belt 5, which means consist of a roller 9 mounted substantially in the extension of the guide 6 for applying loads 3, close to the outlet end of the device (FIGS. 2 and 3). This roller bearing 9 is mounted on the side corresponding to the frame of the corresponding conveyor or transporter 1 and/or 2, through the intermediary of a support lever 10, which is connected by an articulation to the frame by means of a spring-mounted pivoting bearing 11 (FIG. 5) and which, in the rest position, slightly exceeds the alignment of the vertical plane passing through the guide 6 for applying the loads 3. The spring-mounted pivoting bearing is of a known type, and it is mounted on the frame through the intermediary of a fixed axle on which a sleeve is placed, which is returned into a preestablished position through the intermediary of a return spring arranged between said sleeve and the fixed axle.

In addition, this roller 9 is provided advantageously with a cover made of natural or synthetic rubber.

Thus, it is possible to achieve an effective application of the loads 3 against the driving belt 5 throughout their transfer in the driving device, so that said loads can be controlled perfectly insofar as the rate of their delivery from said device is concerned. Indeed, thanks to this roller 9, the slight constrictions in the width of the loads 3 close to their ends, particularly in the case of boxes, are compensated by the roller 9 which remains applied against their longitudinal edge. In addition, the cover of the roller 9, which is made of an elastically deformable material, provides a supplemental compensation of the width of the loads 3.

According to a first embodiment of the invention, which is represented in FIGS. 1 and 2 of the drawings in the appendix, the driving and guiding device 4 can be mounted between an upstream conveyor or transporter 1, and a downstream conveyor or transporter 2, where the latter functions as a loading station or a similar station, and the driving and guiding device 4 forms a device for regulating loads 3 that arrive at a relatively high speed on the upstream conveyor or transporter 1, while the downstream conveyor or transporter 2 operates at a very low speed. To this effect, the ends 5', 5" and 6', 6" of the driving belt 5 and of the application guide 6 extend above the corresponding ends of the upstream conveyors or transporters 1 and the downstream conveyors or transporters 2 to ensure continuity of support and guidance of the loads 3 during their transfer.

Thus, it is possible to regulate the flow of the loads 3 that arrive on the upstream conveyor or transporter 1, and to slow down the loads by means of the driving and guiding device 4 before they are transferred to the downstream conveyor or transporter 2; optionally, to accumulate said loads 3, as a result of a speed-reducing barrier effect, through the intermediary of the driving and guiding device 4, on the upstream conveyor or transporter 1; and, optionally, to produce a spacing between the loads, i.e., the loads arrive from the upstream conveyor or transporter 1 with a spacing between them, and they exit from the driving and guiding device 4 separated by a predetermined spacing. In other words, the driving and guiding device 4 makes it possible to regroup the loads or separate them from each other.

FIG. 3 of the drawings in the appendix represents another embodiment of the invention, in which the driving and guiding device 4 forms a means for transferring loads 3 with a steep slope between the upstream conveyors or transporters 1 and the downstream conveyors or transporters 2, which extend at two different levels and with a small longitudinal separation, where said loads 3 are gripped at the end of the upstream conveyor or transporter 1 and moved obliquely up to the end of the downstream conveyor or transporter 2, by being clamped between the driving belt 5 and the application guide 6 of the driving and guiding device 4.

This arrangement of the drive and guiding device 4 makes it possible to ensure the transfer of the loads 3 between conveyors or transporters that are separated by a great difference in level, while being separated longitudinally by a short distance. The result is that the conveyors or transporters can be installed on a floor area that is clearly smaller than that required for the solutions that have been proposed to date, which consequently reduces the floor area of the facilities, and thus their cost price.

Figure 4:
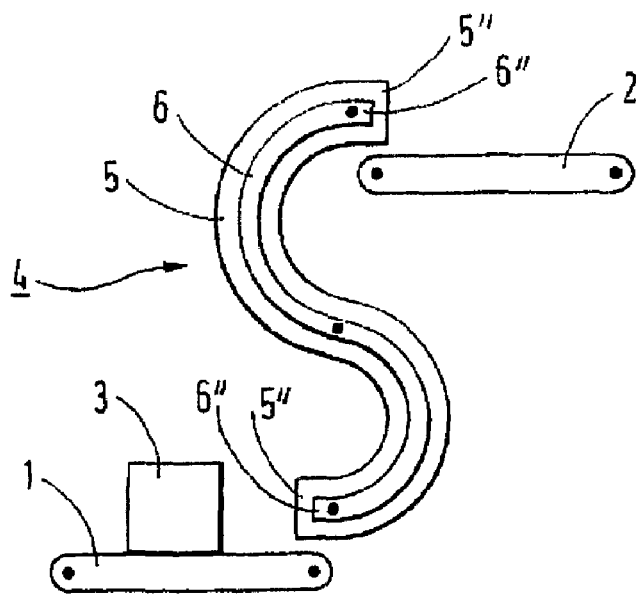
FIG. 4 is a schematic view of a lateral elevation of another embodiment variant of the device according to the invention.

FIG. 4 of the drawings in the appendix represents another embodiment variant of the invention, in which the driving and guiding device 4 is in the form of a driving and guidance unit with multiple loops, where the ends of the driving belt 5 and of the application guide 6 extend above the corresponding ends of the upstream conveyors or transporters 1 and the downstream conveyors and transporters 2, and where these upstream conveyors or transporters 1, and downstream conveyors or transporters 2, are arranged with a great difference in level, and can overlap, at least partially, by their ends, being, on the one hand, extended by the driving and guiding device 4, and, on the other hand, in the extension of said driving and guiding device 4.

Thus, it is possible to hold loads 3 on an upstream conveyor or transporter 1, and to transfer them to a downstream conveyor or transporter 2 which partially overlaps the first one, at a higher level, thus requiring a very small floor area. In addition, in the case where the driving and guiding device 4 carries out a transfer of boxes that contain bottles or other products, which have to be emptied and/or cleaned completely, an embodiment of said driving and guiding device 4 in the form of an S makes it possible to turn the boxes completely upside down as they are being moved, and to empty them onto a waste evacuation transporter arranged under the path of said upside down boxes.

Thanks to the invention, it is possible to produce a device for driving loads between transport means that feed different work stations, by employing means of particularly simple constitution, low cost price and high reliability, which device makes it possible to carry out interventions pertaining to regulation and/or a change in level in relatively small spaces.

Indeed, in comparison to the devices that exist to date, the invention offers an extremely simple solution for the problems associated with the accumulation and the transfer between two different levels, and it is applied particularly advantageously in the field of the transfer of containers, notably bottles.

Naturally, the invention is not limited to the embodiments that have been described and represented in the drawings in the appendix. Modifications are still possible, notably from the point of view of the constitution of the various elements, or by substituting equivalent techniques, without going beyond the scope of protection of the invention.

The invention claimed is:

1. Device for driving load conveyors or transporters, in the form of a driving and guiding means (4), which is integrated in a line of conveyors or transporters (1 and 2) and extends along the longitudinal axis of said conveyors or transporters (1 and 2), perpendicularly to their plane, and which consists essentially of the combination of a driving belt (5), arranged along at least one longitudinal edge or in the extension of longitudinal edges of at least one conveyor or transporter (1 or 2), or of two successive conveyors and transporters (1 and 2), and of a guide (6) for applying loads (3) against the driving belt (5), arranged along the opposite longitudinal edge(s), where the driving belt (5) and the guide (6) for applying the load (3) are arranged, with respect to chains with palettes forming the conveyors or transporters (1 and 2), in such a way that the distance between their opposite face is slightly smaller than the width of the loads (3) transported by said conveyors or transporters (1 and 2), characterized in that the driving belt (5) is a belt with a cover made of rubber or of another material with a high coefficient of friction, and the guide (6) for applying loads (3) is in the form of a rigid blade with ends that are slightly curved inward in the direction opposite the driving belt (5), and with a low coefficient of friction, where said rigid blade is mounted on supports (7) for fixation to the corresponding side of the conveyors or transporters (1 and/or 2), with interposition of means presenting controlled elastic deformation.

2. Device according to claim 1, characterized in that the driving belt (5) is driven independently of the conveyors and transporters (1 and/or 2), and connected to an independent control means, such as a programmable automation device or another device, which controls the speed of said driving belt (5) as a function of the speed required downstream of the driving and guiding means (4).

3. Device according to claim 1, characterized in that the supports (7) for the fixation of the guide (6) for applying the loads (3) are mounted on the frame of the conveyors or transporters (1 and/or 2) with the possibility of movement transversely to the longitudinal axis of said conveyor(s) or transporter(s) (1 and/or 2) by means of controlled jacks (8).

4. Device according to claim 3, characterized in that the control of the jacks (8) is carried out through the intermediary of a programmable automation device or another control device of a conveyance or transport line, whose command and control program is parameterized as a function of the load (3) and of the operations to be carried out.

5. Device according to claim 1, characterized in that it is completed by an additional means for applying the loads (3) against the driving belt (5), which means consists of a roller (9) mounted substantially in the extension of said guide (6) for applying the load (3) close to the outlet end of the device.

6. Device according to claim 5, characterized in that the roller (9) is mounted on the corresponding side of the frame of the corresponding conveyor or transporter (1 and/or 2), through the intermediary of a support lever (10), which is connected by articulation to the frame by means of a spring-mounted pivoting bearing (11) and which, in the rest position, slightly exceeds the alignment of the vertical plane passing through the guide (6) for applying the loads (3).

7. Device according to claim 5, characterized in that the roller (9) is provided with a cover made of natural or synthetic rubber.

8. Device according to claim 1, characterized in that it is mounted between an upstream conveyor or transporter (1) and a downstream conveyor or transporter (2), where the latter functions as a loading station or similar station, and in that it forms a device for the regulation of the loads (3) which arrive at a relatively high speed on the upstream conveyor or transporter (1), while the downstream conveyor or transporter (2) operates at a very low speed.

9. Device according to claim 1, characterized in that it forms a load transfer means (3) with a steep slope between the upstream conveyors or transporters (1) and the downstream conveyors or transporters (2), which extends at two different levels and with small longitudinal separation, where the loads (3) are gripped at the end of the upstream conveyor or transporter (1) and moved obliquely until they are on the end of the downstream conveyor or transporter (2), by tightening between the driving belt (5) and the guide (6) for applying the driving and guiding device (4).

10. Device according to claim 1, characterized in that it is in the form of a driving and guidance unit with multiple loops, where the ends of the driving belt (5) and of the application guide (6) extend above the corresponding ends of the upstream conveyors or transporters (1) and the downstream conveyors or transporters (2), where these upstream conveyors or transporters (1) and downstream conveyors or transporters (2) are arranged with a large difference in level and can overlap, at least partially, by their ends, being, on the one hand, extended by the driving and guiding device (4), and, on the other hand, in the extension of said driving and guiding device (4).

* * * * *